July 14, 1959
W. D. TRACY
2,894,789
MEANS AND TECHNIQUES APPLICABLE TO
BEARINGS AND ROD END BEARINGS
Original Filed Aug. 23, 1954
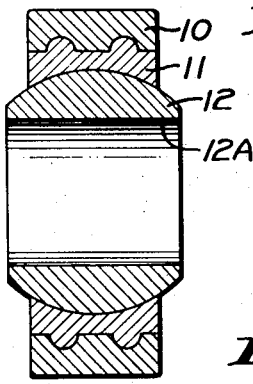
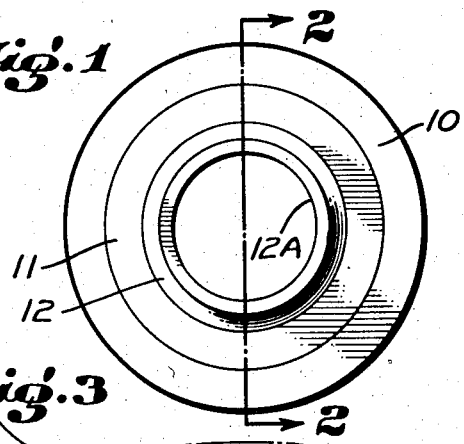
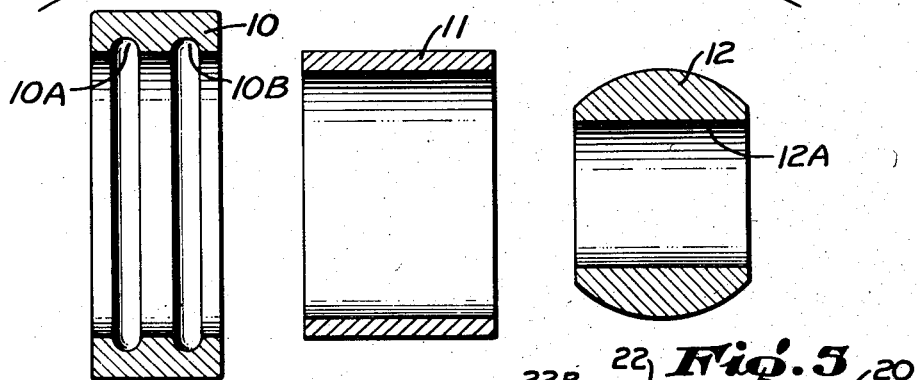
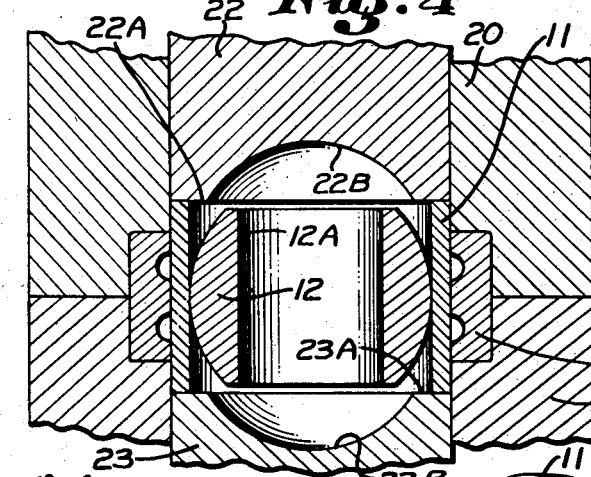
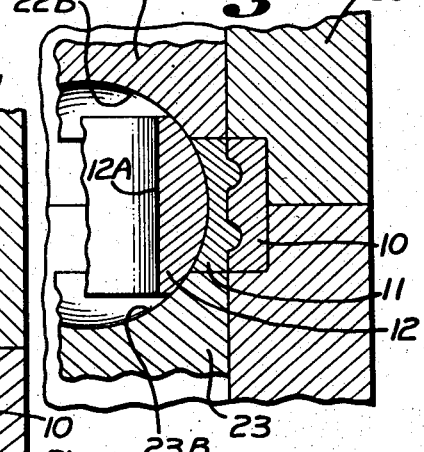
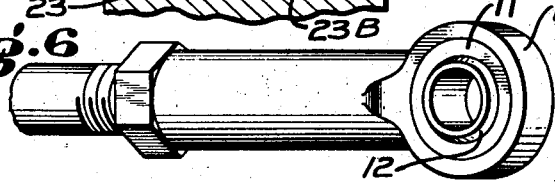
INVENTOR.
WARD D. TRACY
BY Lyon & Lyon
ATTORNEYS United States Patent Office 2,894,789
Patented July 14, 1959

2,894,789

MEANS AND TECHNIQUES APPLICABLE TO BEARINGS AND ROD END BEARINGS

Ward D. Tracy, Glendora, Calif., assignor to Southwest Products Co., Duarte, Calif., a corporation of California Original application August 23, 1954, Serial No. 451,373, now Patent No. 2,804,679, dated September 3, 1957. Divided and this application August 24, 1956, Serial No. 606,141

5 Claims. (Cl. 308—72)

The present invention relates to an improved bearing structure of the self-aligning type. The present application is a division of my application, Serial No. 451,373, filed August 23, 1954, now United States Letters Patent No. 2,804,679 issued September 3, 1957.

Bearings and rod end bearings of the self-aligning type which comprise a ball-shaped member rotatably maintained in a race member have been widely used in industry. Such self-aligning type of bearings, heretofore, included many different forms and shapes of inserts between such ball-shaped member and the surrounding race member. Many different problems are involved arising from the clearance required of the ball-shaped member in the race member, and many different devious means have heretofore been suggested for solving such problems, some of which involve costly and skilled procedures as well as a finished bearing in which the fitting of the ball within the insert left much to be desired in the way of uniform and accurate dimensional tolerance and an insert which covered a large extended projected area of the ball for distributing stresses over a larger area.

It is, therefore, an object of the present invention to provide an improved bearing structure using an insert between the ball and race member that is relatively inexpensive to manufacture, and that allows maintenance of uniform and accurate dimensional tolerances, and that allows the distribution of stresses over a larger extended area whereby larger forces may be applied between the ball and the outer race member, particularly in bearings and rod end bearings where it is desired to accommodate greater axial thrust and vibration.

A specific object of the present invention is to provide a bearing structure of this character in which the race member or the rod end housing (in the case of a rod end bearing) is preformed with one or more annular inner grooves into which the insert material may be pressed to hold the same therein simultaneously when such insert is being coined around a portion of the ball.

Another specific object of the present invention is to provide a bearing assembly of this character in which the insert comprises a single unitary element which is affixed to the race member at the time the insert is being coined around the ball.

Another specific object of the present invention is to provide a bearing structure of this character which is simple and inexpensive to assemble.

Another specific object of the present invention is to provide an improved rod end bearing.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 1 is a top plan view of a novel bearing that incorporates features of the present invention.

Figure 2 is a sectional view taken substantially on the line 2—2 of Figure 1.

Figure 3 illustrates the three elements prior to their assembly in the form illustrated in Figures 1 and 2.

Figure 4 illustrates the elements shown in Figure 3 in a press die structure at the instant the insert is being compressed.

Figure 5 is an illustration similar to that shown in Figure 4 but in this instance the inner press dies have been moved towards each other to deform the insert.

Figure 6 illustrates a rod end bearing embodying the present invention.

The bearing, which may or may not be a part of a rod end bearing, as shown in Figure 6, illustrated herein includes an outer race member 10, an insert 11, and a ball-shaped bearing member 12, which may have a cylindrical apertured portion 12A for fastening purposes. Likewise, if desired, the outer race member 10 may be fabricated in various shapes, for example, it may be provided with a threaded stem for use as a rod end bearing, or with an ear, a flange or a pedestal for attachment to different members.

The outer race member 12 may be of relatively hard material such as carbon steel to withstand stress and wear and the same is not deformed in the manufacturing process described below in connection with Figures 4 and 5. In accordance with an important feature of the present invention, such race member 10 which is generally cylindrical or ring-shaped is provided with an inner re-entrant surface, defined, in this instance, by one or more inner annular grooved portions 10A and 10B. It is within such re-entrant inner surface that the relatively soft insert material is "upset," "squeezed" or "crowded" in the assembly operation described later.

The insert 11, of relatively soft material, preferably cold working bearing bronze, originally is as shown in Figures 3 and 4, in the form of a cylindrical tube, the outer diameter of which is equal substantially to the inner diameter of the race member 10, the inner diameter of the tubular insert 11 being originally substantially equal to the maximum diameter of the inner ball 12, all as illustrated in Figure 4.

The inner ball 12 is of conventional manufacture and is preferably of relatively hard material, such as, for example, carbon steel; and its dimensions are not altered in the assembly operation.

While the race member 10 is shown in the drawings as having two annular grooved portions 10A and 10B, it is understood that such operation 10 may be provided with only one grooved portion having a width, for example, as measured along the longitudinal axis of the race member 10, of $^{45}/_{1000}$ of an inch (.045 inch) while the depth of such grooved portion may be, for example, $^{1}/_{32}$ of an inch. Of course, while the use of annular grooved portions is preferred, it is conceivable that less or equal satisfactory results may be obtained when the inner surface of the race member 10 is made re-entrant in accordance with other different patterns.

In the assembly operation, as illustrated in connection with Figures 4 and 5, the race member 10 is snugly received within a pair of abutting annular shouldered members 20 and 21 that serve to hold and confine the race member 10. A pair of circular die presses 22 and 23 are slidably received in the members 20 and 21, and have their adjacent ends dished to allow respectively an annular shoulder 22A and 23A for contacting opposite ends of the bearing insert 11. The dished portions 22B and 23B of the press dies 22 and 23 are each defined by a radius which is substantially equal to the radius of the ball 12 so as to obtain the general conformity between the various elements illustrated in Figure 5, at the end of the assembly operation.

After the various elements are assembled, as illustrated in Figure 4, the dies 22 and 23 are both moved toward each other to produce two results simultaneously, namely, (1) a coining of the material of the insert 11 around the outer periphery of the ball 12, and (2) a crowding of the material of the insert 11 into the re-entrant inner surface of the race member 10. In other words, some of the material of the insert 11 is caused to move radially inwardly while other portions of the insert 11 are caused to move radially outwardly with reference to the axis of the original cylindrical insert 11.

Thus, after the condition illustrated in Figure 5 is achieved, the members 20 and 21 may be separated and the assembled bearing structure, as illustrated in Figure 2, is available for use. For all intents and purposes, the insert 11, in this condition, may be considered to be integral and a part of the race member 10.

The forming apparatus illustrated in Figures 4 and 5 may have such dimensions and may be so manipulated that, the correct desired dimensional tolerance between the insert 11 and the ball 12 exists; or, alternatively, the insert 11 may be squeezed to such an extent as to cause the insert material 11 to bind against the ball 12 so that the ball 12 may not be free to move. In the latter case, the correct dimensional tolerance between the ball and the race may be established using prior art techniques.

While the particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. A self-aligning bearing comprising a race having an inner indented portion, a ball, and a one piece insert of malleable material between said race and said ball with a portion of said insert being deformed in said indented portion and with said insert being coined around said ball.

2. A self-aligning bearing comprising an outer race, an inner ball and an intermediate one piece insert of malleable material, said race having an inner re-entrant portion into which a portion of said insert is deformed to join said insert with said race, and said insert having an inner curved surface coined against a portion of the outer periphery of said ball.

3. A self-aligning bearing comprising an outer race, an inner ball and an intermediate one piece insert of malleable material, said race having an inner re-entrant portion into which a portion of said insert is deformed to join said insert with said race, and said insert having an inner curved surface coined against a portion of the outer periphery of said ball, said re-entrant portion of said race comprising an internal annular groove in said race, said insert being of relatively soft malleable material compared to the softness of said race and said ball and said insert being of different material than the material of said ball.

4. A self-aligning bearing comprising an outer race, an inner ball and an intermediate one piece insert of malleable material, said race having an inner re-entrant portion into which a portion of said insert is deformed to join said insert with said race, and said insert having an inner curved surface coined against a portion of the outer periphery of said ball, said re-entrant portion of said race comprising an internal annular groove in said race, said bearing forming a part of a rod end bearing.

5. A self-aligning bearing as set forth in claim 1 in which said insert is of relatively soft material containing copper such as bronze and said race and said ball are each of relatively hard material such as steel.

References Cited in the file of this patent

UNITED STATES PATENTS

| | | |
|---|---|---|
| 1,515,266 | Mitchell | Nov. 11, 1924 |
| 2,615,764 | Leake | Oct. 28, 1952 |
| 2,759,244 | Heim | Aug. 21, 1956 |

FOREIGN PATENTS

| | | |
|---|---|---|
| 815,872 | Germany | Oct. 4, 1951 |